United States Patent
Nakazawa et al.

(10) Patent No.: US 12,116,126 B2
(45) Date of Patent: Oct. 15, 2024

(54) INFORMATION PROCESSING SYSTEM, INFORMATION PROCESSING DEVICE, AND INFORMATION PROCESSING METHOD

(71) Applicant: Rakuten Group, Inc., Tokyo (JP)

(72) Inventors: Mitsuru Nakazawa, Tokyo (JP); Jun Takizawa, Chino (JP)

(73) Assignee: Rakuten Group, Inc., Tokyo (JP)

( * ) Notice: Subject to any disclaimer, the term of this patent is extended or adjusted under 35 U.S.C. 154(b) by 103 days.

(21) Appl. No.: 17/311,717

(22) PCT Filed: Aug. 20, 2019

(86) PCT No.: PCT/JP2019/032409
§ 371 (c)(1),
(2) Date: Jun. 8, 2021

(87) PCT Pub. No.: WO2021/033256
PCT Pub. Date: Feb. 25, 2021

(65) Prior Publication Data
US 2022/0024582 A1    Jan. 27, 2022

(51) Int. Cl.
*B64C 39/02* (2023.01)
*G06T 7/50* (2017.01)
*G08G 5/00* (2006.01)
*G08G 5/02* (2006.01)

(52) U.S. Cl.
CPC .............. *B64C 39/024* (2013.01); *G06T 7/50* (2017.01); *G08G 5/0013* (2013.01); *G08G 5/0056* (2013.01); *G08G 5/0069* (2013.01); *G08G 5/02* (2013.01); *B64U 2201/20* (2023.01); *G06T 2207/10032* (2013.01)

(58) Field of Classification Search
CPC .................. B64C 39/024; G06T 7/50; G06T 2207/10032; G08G 5/0013; G08G 5/0056; G08G 5/0069; G08G 5/02; B64U 2201/20
See application file for complete search history.

(56) References Cited

U.S. PATENT DOCUMENTS

| | | | |
|---|---|---|---|
| 10,059,459 B2 * | 8/2018 | Clark ..................... | G05D 1/105 |
| 2016/0327959 A1 * | 11/2016 | Brown ................ | G08G 5/0013 |
| 2017/0345317 A1 * | 11/2017 | Heinonen .............. | G01C 21/20 |
| 2018/0074518 A1 * | 3/2018 | Cantrell ........... | G06Q 10/06311 |

(Continued)

FOREIGN PATENT DOCUMENTS

| | | |
|---|---|---|
| JP | 2018-165870 A | 10/2018 |
| WO | 2019/008669 A1 | 1/2019 |
| WO | 2019/146579 A1 | 8/2019 |

OTHER PUBLICATIONS

International Search Report of PCT/JP2019/032409 dated Oct. 15, 2019 [PCT/ISA/210].

*Primary Examiner* — Hussein Elchanti
(74) *Attorney, Agent, or Firm* — Sughrue Mion, PLLC

(57) ABSTRACT

The unmanned aerial vehicle system S identifies a landing point candidate that is a candidate for an emergency landing point for causing an UAV 1 flying toward a destination point to make an emergency landing at other than the destination point and calculate a recovery cost regarding a recovery route candidate connecting a reference point and the landing point candidate, the recovery cost being used to determine a recovery route connecting the reference point and the emergency landing point or the emergency landing point.

26 Claims, 8 Drawing Sheets

(56) References Cited

U.S. PATENT DOCUMENTS

| | | | |
|---|---|---|---|
| 2019/0009904 A1* | 1/2019 | Winkle | B64C 39/024 |
| 2020/0130831 A1* | 4/2020 | Luca | B64C 5/12 |
| 2020/0258400 A1* | 8/2020 | Yuan | G06V 20/10 |
| 2020/0299002 A1* | 9/2020 | Nielsen | B64F 5/60 |
| 2020/0331607 A1* | 10/2020 | Yamada | G08G 5/0091 |
| 2022/0024582 A1* | 1/2022 | Nakazawa | B64C 39/024 |
| 2022/0158860 A1* | 5/2022 | West | G06Q 10/1095 |

* cited by examiner

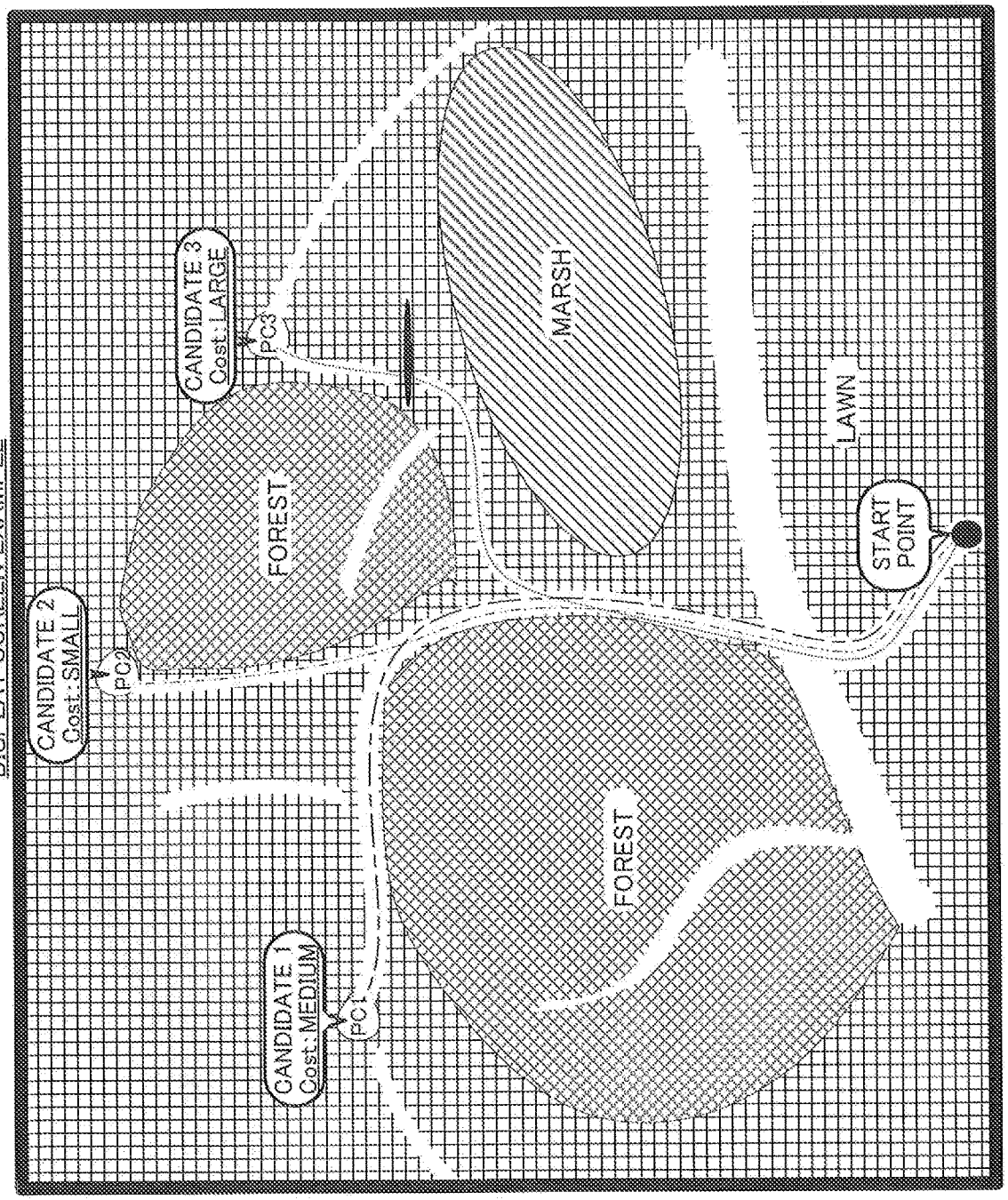

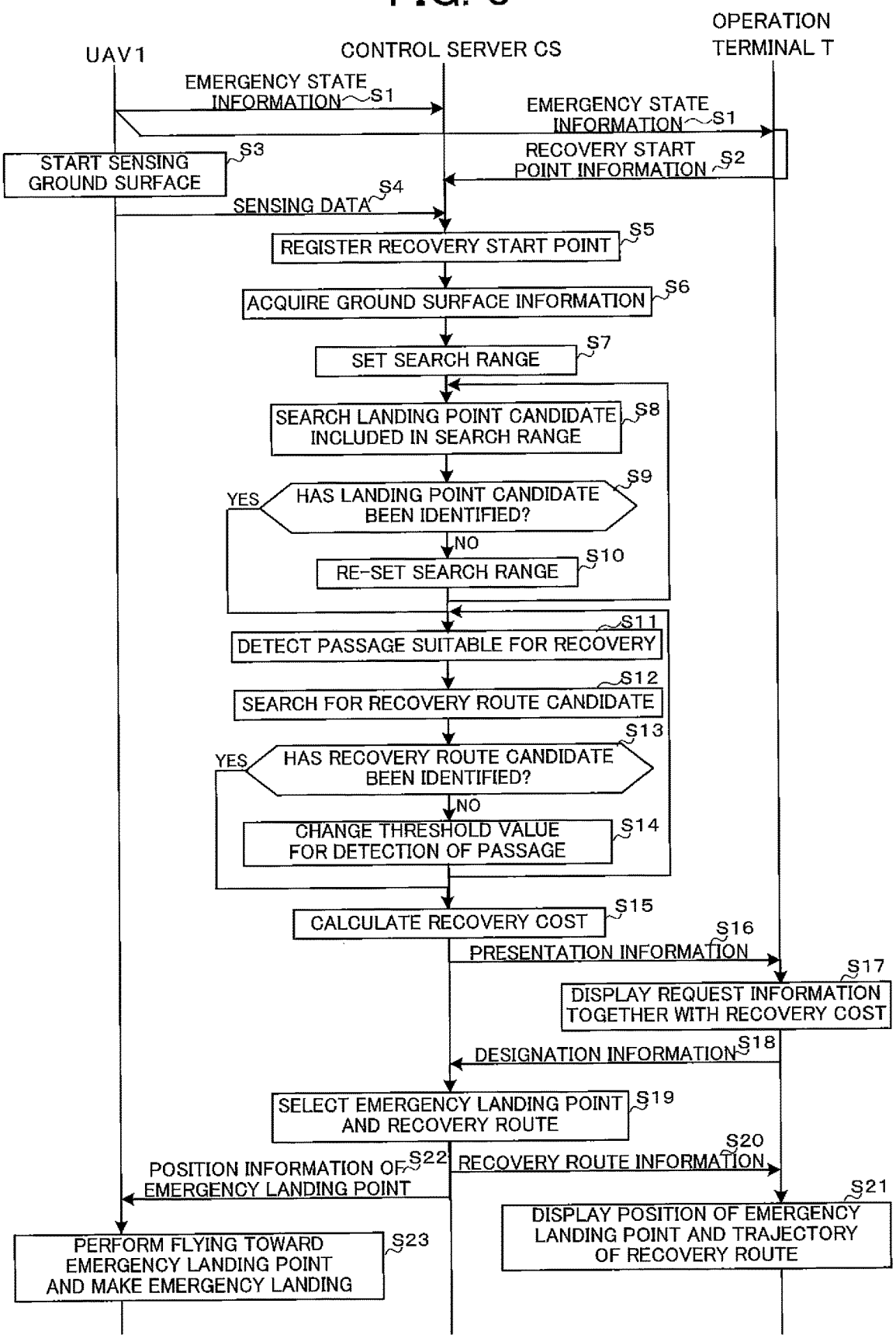

INFORMATION PROCESSING SYSTEM, INFORMATION PROCESSING DEVICE, AND INFORMATION PROCESSING METHOD

CROSS REFERENCE TO RELATED APPLICATIONS

This application is a National Stage of International Application No. PCT/JP2019/032409 filed on Aug. 20, 2019.

TECHNICAL FIELD

The present invention relates to a technical field such as a system for identifying a landing point for causing an unmanned aerial vehicle flying toward a destination point to make an emergency landing.

BACKGROUND ART

During the flight of an unmanned aerial vehicle, when an abnormality occurs in parts (battery, rotor, sensor, or the like) of the unmanned aerial vehicle or when an abnormal situation such as prediction of a sudden change in weather occurs, in some cases, the unmanned aerial vehicle is caused to make an emergency landing. Patent Literature 1 discloses a technology in which an unmanned aerial vehicle is caused to fly while securing safe landing point candidates in case of occurrence of an abnormal situation and when an abnormal situation occurs, the optimum landing point is selected from the landing point candidates. More specifically, first, for ground threats that threaten safe landing, the threat level is calculated by quantifying the degree to which contact should be avoided, and when an abnormality is detected in the unmanned aerial vehicle, the unmanned aerial vehicle is urged to land at a candidate point where the threat level is equal to or less than a predetermined value.

CITATION LIST

Patent Literature

Patent Literature 1: JP 2018-165870 A

SUMMARY OF INVENTION

Technical Problem

By the way, after the unmanned aerial vehicle makes an emergency landing, it is desirable to promptly recover the unmanned aerial vehicle. However, when the landing point is selected considering only the threat level to the threat on the ground as mentioned above, there has been a possibility that the landing point that is not suitable for recovery is selected because the recovery of the unmanned aerial vehicle after the emergency landing is not considered. As a result, for example, it may take a long time to recover the unmanned aerial vehicle, or it may be difficult to recover the unmanned aerial vehicle.

Therefore, one or more embodiments of the present invention are directed to provide an information processing system, an information processing device, and an information processing method capable of obtaining suitable information for recovering an unmanned aerial vehicle.

Solution to Problem

In response to the above issue, the invention according to claim 1 is an information processing system. The information processing system includes: a point candidate identifying unit configured to identify a landing point candidate that is a candidate for a landing point for causing an unmanned aerial vehicle flying toward a destination point to make an emergency landing at other than the destination point; and a recovery cost calculation unit configured to calculate a recovery cost regarding a recovery route candidate connecting a reference point and the landing point candidate, the recovery cost being used to determine a recovery route connecting the reference point and the landing point or the landing point. This makes it possible to obtain suitable information for recovering the unmanned aerial vehicle.

The invention according to claim 2 is the information processing system according to claim 1, wherein the point candidate identifying unit identifies the landing point candidate suitable for landing of the unmanned aerial vehicle on the basis of information of a ground surface in a predetermined area. This makes it possible to accurately identify a landing point candidate suitable for landing of the unmanned aerial vehicle.

The invention according to claim 3 is the information processing system according to claim 2, wherein the information of the ground surface includes at least one of three-dimensional shape data of the ground surface and a ground surface attribute. This makes it possible to accurately identify a landing point candidate suitable for landing of the unmanned aerial vehicle.

The invention according to claim 4 is the information processing system according to any one of claims 1 to 3, wherein the point candidate specifying unit searches for the landing point candidate included in a search range set based on a current position of the unmanned aerial vehicle. This makes it possible to identify a landing point candidate that the unmanned aerial vehicle can easily reach.

The invention according to claim 5 is the information processing system according to claim 4, wherein the point candidate identifying unit sets the search range according to information regarding an emergency state of the unmanned aerial vehicle. This makes it possible to identify a landing point candidate that can be easily reached according to the urgency of the unmanned aerial vehicle.

The invention according to claim 6 is the information processing system according to any one of claims 1 to 5 further including: a passage detection unit configured to detect a passage suitable for recovery of the unmanned aerial vehicle on the basis of information of a ground surface in a predetermined area; and a route candidate search unit configured to search for the recovery route candidate on the basis of the passage detected by the passage detection unit. This makes it possible to identify more recovery route candidates.

The invention according to claim 7 is the information processing system according to claim 6, wherein the route candidate search unit searches for the recovery route candidate formed by connecting a plurality of the passages detected by the passage detection unit. This makes it possible to identify more recovery route candidates.

The invention according to claim 8 is the information processing system according to claim 6 or 7, wherein the route candidate search unit searches for the recovery route candidate so that, among a first passage that both a recoverer and a recovery vehicle can pass through and a second passage that only the recoverer out of the recoverer and the recovery vehicle can pass through, the first passage is prioritized. This makes it possible to reduce the load and time required for the recovery of the unmanned aerial vehicle, because the recoverer can efficiently use the recovery vehicle when recovering the unmanned aerial vehicle.

The invention according to claim 9 is the information processing system according to any one of claims 6 to 8, wherein the recovery cost calculation unit calculates the recovery cost for each of a plurality of the recovery route candidates searched by the route candidate search unit. This makes it possible to achieve determination of a recovery route by comparing the recovery costs for each of the plurality of recovery route candidates.

The invention according to claim 10 is the information processing system according to any one of claims 1 to 9, wherein the recovery cost calculation unit calculates the recovery cost for each of a plurality of the landing point candidates identified by the point candidate identifying unit. This makes it possible to achieve determination of a landing point by comparing the recovery costs for each of a plurality of landing point candidates.

The invention according to claim 11 is the information processing system according to any one of claims 1 to 10, wherein the recovery cost calculation unit calculates the recovery cost on the basis of a distance of the recovery route candidate. This makes it possible to calculate an appropriate recovery cost commensurate with the distance of the recovery route candidate.

The invention according to claim 12 is the information processing system according to any one of claims 1 to 11, wherein the recovery cost calculation unit calculates the recovery cost on the basis of a parameter representing a feature amount in the recovery route candidate. This makes it possible to calculate an appropriate recovery cost commensurate with the feature amount in the recovery route candidate.

The invention according to claim 13 is the information processing system according to claim 12, wherein the parameter includes at least one of magnitude of a gradient in the recovery route candidate and a priority level of a ground surface attribute. This makes it possible to calculate an appropriate recovery cost for at least one of the magnitude of the gradient in the recovery route candidate and the priority level of the ground surface attribute.

The invention according to claim 14 is the information processing system according to any one of claims 1 to 13, wherein the recovery cost calculation unit calculates the recovery cost by distinguishing between an outward trip and a return trip in the recovery route candidate. This makes it possible to calculate the recovery cost in consideration of the recoverer carrying the unmanned aerial vehicle on the return trip.

The invention according to claim 15 is the information processing system according to any one of claims 1 to 14 further including: a landing point selection unit configured to select the landing point from a plurality of the landing point candidates on the basis of the recovery cost calculated for each of the plurality of the landing point candidates. This makes it possible to quickly determine a landing point from a plurality of landing point candidates.

The invention according to claim 16 is the information processing system according to claim 15, wherein the landing point selection unit selects the landing point further on the basis of a positional relationship between a current position of the unmanned aerial vehicle and the landing point candidate. This makes it possible to quickly determine a landing point that the unmanned aerial vehicle can easily reach from a plurality of landing point candidates.

The invention according to claim 17 is the information processing system according to any one of claims 1 to 14 further including: a presentation unit configured to present information including the recovery cost calculated for each of a plurality of the landing point candidates to a user of the unmanned aerial vehicle; and a landing point selection unit configured to select the landing point from the plurality of the landing point candidates on the basis of designation of the landing point candidate by the user. This makes it possible to determine a landing point desired by the user from a plurality of landing point candidates.

The invention according to claim 18 is the information processing system according to any one of claims 1 to 17 further including: a recovery route selection unit configured to select the recovery route from a plurality of the recovery route candidates on the basis of the recovery cost calculated for each of the plurality of the recovery route candidates. This makes it possible to quickly determine a recovery route from a plurality of recovery route candidates.

The invention according to claim 19 is the information processing system according to any one of claims 1 to 18, further including: a control unit configured to control the unmanned aerial vehicle to land at the landing point. This makes it possible to cause the unmanned aerial vehicle that is in an emergency state to land at the landing point.

The invention according to claim 20 is an information processing device. The information processing device includes: a recovery cost calculation unit configured to calculate a recovery cost regarding a recovery route candidate connecting a landing point candidate identified as a candidate for a landing point for causing an unmanned aerial vehicle flying toward a destination point to make an emergency landing at other than the destination point and a reference point, the recovery cost being used to determine a recovery route connecting the reference point and the landing point or the landing point.

The invention according to claim 21 is an information processing method executed by one or a plurality of computers. The information processing method includes: a step of identifying a landing point candidate that is a candidate for a landing point for causing an unmanned aerial vehicle flying toward a destination point to make an emergency landing at other than the destination point; and a step of calculating a recovery cost regarding a recovery route candidate connecting a reference point and the landing point candidate, the recovery cost being used to determine a recovery route connecting the reference point and the landing point or the landing point.

Advantageous Effect of the Invention

According to one or more embodiments of the present invention, it is possible to obtain suitable information for recovering the unmanned aerial vehicle.

BRIEF DESCRIPTION OF THE DRAWINGS

FIG. 7 is a diagram illustrating an example of a display screen on which the request information for designating a landing point candidate is displayed.

FIG. 8 is a sequence diagram illustrating an example of the operation of the unmanned aerial vehicle system S after the UAV 1 is in the emergency state.

DESCRIPTION OF EMBODIMENTS

Hereinafter, an unmanned aerial vehicle system according to an embodiment of the present invention will be described with reference to the drawings.

[1. Configuration and Operation Outline of Unmanned Aerial Vehicle System S]

Figure 1:
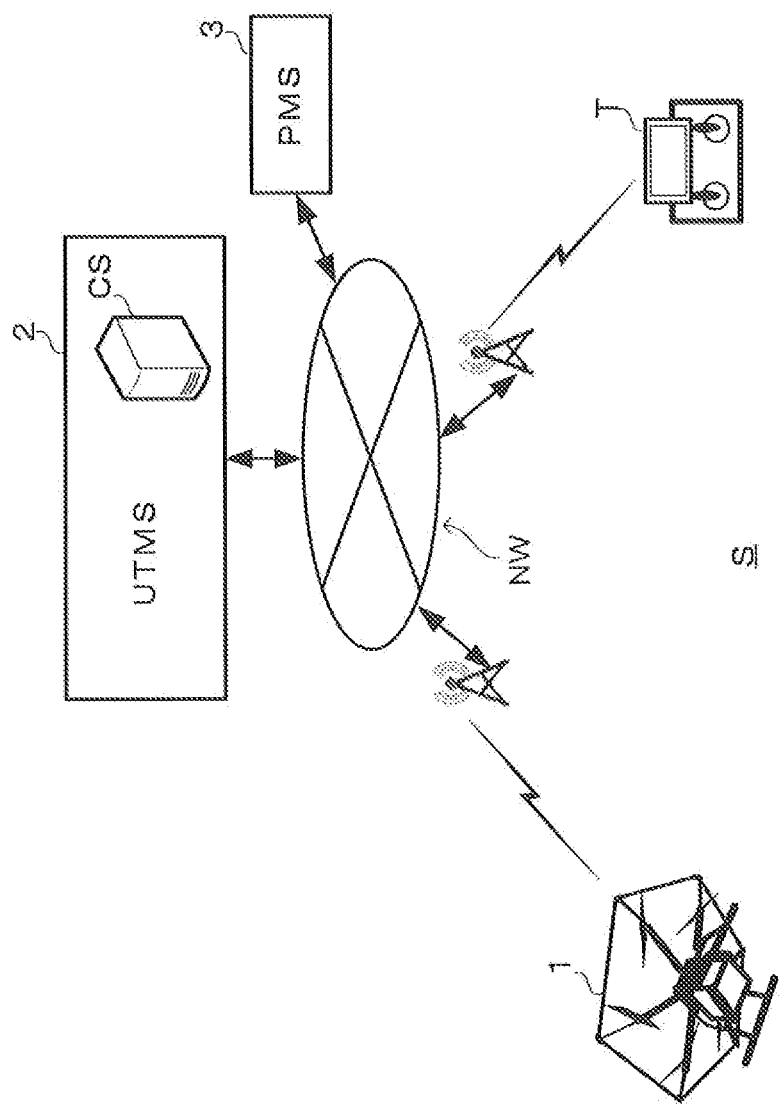
FIG. 1 is a diagram illustrating a schematic configuration example of an unmanned aerial vehicle system S.

First, the configuration and operation outline of an unmanned aerial vehicle system S according to the present embodiment will be described with reference to FIG. 1. FIG. 1 is a diagram illustrating a schematic configuration example of the unmanned aerial vehicle system S. As illustrated in FIG. 1, the unmanned aerial vehicle system S is configured to include an unmanned aerial vehicle (hereinafter referred to as "UAV (Unmanned Aerial Vehicle)") 1 that flies in the atmosphere (air), a traffic management system (hereinafter referred to as "UTMS (UAV Traffic Management System)") 2, and a port management system (hereinafter referred to as "PMS (Port Management System)") 3. The UAV 1, the UTMS 2, and the PMS 3 can communicate with one another via a communication network NW. The communication network NW includes, for example, the Internet, a mobile communication network, a radio base station thereof, and the like. Incidentally, the UTMS 2 and the PMS 3 may be configured as one management system.

The UAV 1 is capable of flying by remote control or flying autonomously in the atmosphere from a flight start point to a destination point. The UAV 1 is also called a drone or a multi-copter. The UAV 1 is used, for example, for transporting (for example, delivery) an article, observing the situation on the ground, and the like. In the present embodiment, it is assumed that the UAV 1 in an emergency state is caused to make an emergency landing at a landing point (hereinafter referred to as "emergency landing point") other than the destination point. Here, the point has a land area of a certain size. The emergency state is a state in which it is difficult for the UAV 1 to maintain normal flight due to occurrence of an abnormality in the UAV 1 or sudden changes (deterioration) in weather within the range of the flight of the UAV 1, for example. The destination point of the UAV 1 is, for example, a planned landing point set before the start of flight of the UAV 1, which is different from the emergency landing point. Incidentally, the UAV 1 is managed by a GCS (Ground Control Station) and can be remotely controlled by an operator from the ground. For example, the GCS is installed as an application in an operation terminal T that can be connected to the communication network NW. In this case, the operator is, for example, a person who operates the operation terminal T to remotely control the UAV 1, and is positioned as the user of the UAV 1. Alternatively, the GCS may be configured by a server or the like. In this case, the operator is, for example, an administrator (a manager) in the GCS (e.g., a person who remotely controls the UAV 1 from a traffic control center) or a controller provided in the server. The administrator is positioned as the user of the UAV 1.

The UTMS 2 is configured to include one or more servers including a control server CS. The control server CS is an example of the information processing device. The UTMS 2 manages traffic and flight of the UAV 1. The traffic management of the UAV 1 includes management of a traffic plan of the UAV 1 before the flight, management of a flight status of the UAV 1 in flight, and control of the UAV 1 in flight. The traffic plan of the UAV 1 before the flight is a flight plan including, for example, a planned route from the flight start point to the destination point. The destination point is, for example, a planned landing point set before the start of the flight of UAV 1, which is different from the emergency landing point described above. The management and control of the flight status of the UAV 1 is performed on the basis of aircraft information of the UAV 1. The aircraft information of the UAV 1 includes at least position information of the UAV 1. The position information of the UAV 1 indicates the current position (self-position) of the UAV 1. The current position of the UAV 1 is a flight position of the UAV 1 in flight. The aircraft information of the UAV 1 may include speed information of the UAV 1. The speed information indicates a flight speed of the UAV 1. Incidentally, the UTMS 2 performs air traffic control such as giving information and instructions to the UAV 1.

The PMS 3 is configured to include one or a plurality of servers and the like. The PMS 3 manages a takeoff and landing facility (hereinafter, referred to as "port") which is the destination point of the UAV 1. The port is managed on the basis of port position information, port reservation information, and the like. Here, the port position information indicates an installation position of the port. The port reservation information includes: an aircraft ID of the UAV 1 that has reserved the port; the reservation date and time; and the like. The aircraft ID of the UAV 1 is identification information to identify the UAV 1. The reservation of the port to be used by the UAV 1, for example, is requested to PMS 3 by the GCS that manages UAV 1.

[1-1. Configuration and Function Outline of the UAV 1]

Figure 2:
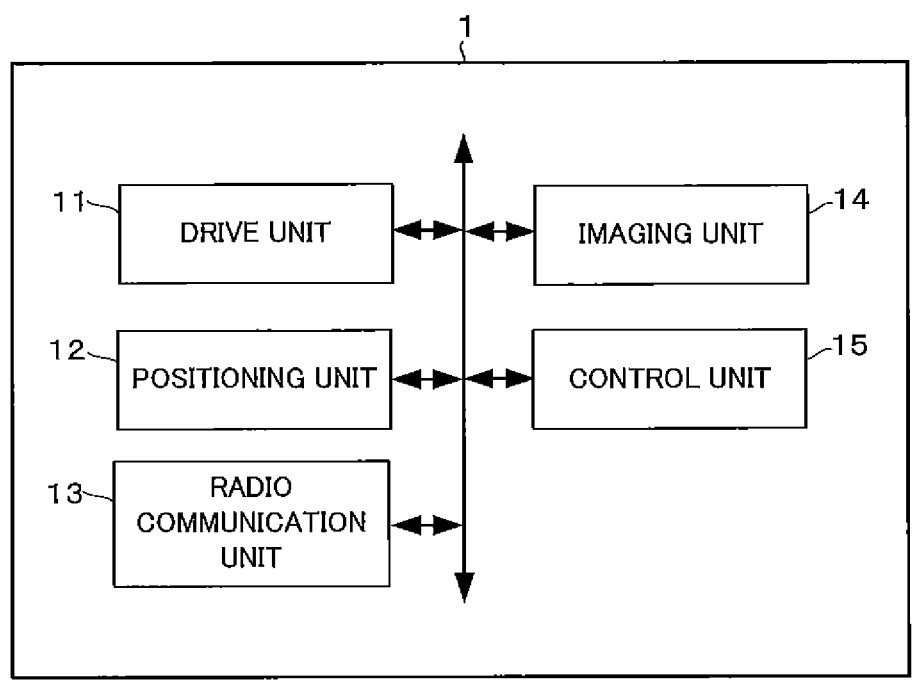
FIG. 2 is a diagram illustrating a schematic configuration example of a UAV 1.

Next, the configuration and function outline of the UAV 1 will be described with reference to FIG. 2. FIG. 2 is a diagram illustrating a schematic configuration example of the UAV 1. As illustrated in FIG. 2, the UAV 1 includes a drive unit 11, a positioning unit 12, a wireless communication unit 13, an imaging unit 14, a control unit 15, and the like. Incidentally, although not illustrated, the UAV 1 includes a rotor (propeller) that is a horizontal rotary blade, various sensors, a battery that supplies power to each of the units of the UAV 1, and the like. The various sensors used for flight control of the UAV 1 include a barometric sensor, a triaxial acceleration sensor, a geomagnetic sensor, weather sensor, and the like. The weather sensor is used to monitor the weather conditions. Detection information detected by the various sensors is output to the control unit 15.

The drive unit 11 includes a motor, a rotating shaft, and the like. The drive unit 11 rotates the rotors with the motor, the rotating shaft, and the like that are driven in accordance with a control signal output from the control unit 15. The positioning unit 12 includes a radio wave receiver, an altitude sensor, and the like. For example, the positioning unit 12 receives, by the radio wave receiver, a radio wave sent from a satellite of a GNSS (Global Navigation Satellite System) and detects a current position (latitude and longitude) in a horizontal direction of the UAV 1 on the basis of the radio wave. Incidentally, the current position in the horizontal direction of the UAV 1 may be corrected on the basis of an image data captured by the imaging unit 14 or a radio wave sent from the radio base station. Further, the positioning unit 12 may detect the current position (altitude) in a vertical direction of the UAV 1 with the altitude sensor.

The position information indicating the current position detected by the positioning unit 12 is output to the control unit 15.

The wireless communication unit 13 performs control of communication performed via a communication network NW. The imaging unit 14 includes a camera (2D or 3D camera) and the like. The imaging unit 14 continuously captures a real space within the range within the angle of view of the camera. The image data captured by the imaging unit 14 is output to the control unit 15. In addition to flight control of the UAV 1, the camera is also used as a sensor for ground surface sensing. Here, the ground surface sensing means observing (monitoring) the ground surface (which may include an object existing in contact with the ground, and the like) with the UAV 1 as a viewpoint. The ground surface is not limited to flat, but may have irregularities. For the ground surface sensing, for example, the UAV 1 may include at least one sensor (sensor device) such as an infrared sensor, a thermal sensor, an ultrasonic sensor, a photoelectric sensor, a laser sensor, and a LiDAR (light Detection and Ranging or Laser Imaging Detection and Ranging). Incidentally, the sensing data obtained by ground surface sensing may be the image data obtained by capturing with the camera or may be various types of data obtained by sensing of various sensors provided on the UAV 1 such as the infrared sensor, the thermal sensor, the ultrasonic sensor, the photoelectric sensor, the laser sensor, and the LiDAR.

The control unit 15 includes a CPU (Central Processing Unit), which is a processor, a ROM (Read Only Memory), a RAM (Random Access Memory), a non-volatile memory, and the like. The control unit 15 determines whether the emergency state has occurred by monitoring the state of each part (the battery, the rotor, the sensor, the positioning unit, and the like) of the UAV 1 and/or the weather conditions during the flight of the UAV 1 according to a state monitoring program (program code group) stored in, for example, the ROM or the non-volatile memory. For example, when an abnormality in each part of the UAV 1 or a weather abnormality is detected, it is determined that the emergency state has occurred. Then, the control unit 15, when having determined that the emergency state has occurred, transmits information (hereinafter referred to as "emergency state information") regarding the emergency state of the UAV 1 together with the aircraft ID and the aircraft information of the UAV 1 to a control server CS via the wireless communication unit 13. The emergency state information may be information indicating that the emergency state has occurred. The emergency state information may include, for example, at least one of the details of the emergency state, the type of the emergency state, the level (rank) of the emergency state, and the like.

Here, examples of the type of the emergency state include insufficient battery level, rotor abnormality, sensor abnormality, positioning abnormality, weather abnormality, and the like. The level of the emergency state indicates, for example, the degree of difficulty of maintaining the flight of the UAV 1 in a plurality of stages (e.g., five stages: 1, 2, 3, 4, and 5, and in this case, level 5 is the highest). The level of the emergency state is determined according to the type of the emergency state, for example, as follows: level 5 in the case of insufficient battery level, level 4 in the case of rotor abnormality, level 3 in the case of sensor abnormality, level 2 in the case of positioning abnormality, and level 1 in the case of weather abnormality. Alternatively, the level of the emergency state may be determined according to the degree of abnormality (risk) within the type of the emergency state, for example, as follows: level 5 when the remaining battery level is less than 3% or when more than half of the rotors are abnormal.

Moreover, the control unit 15, when the UAV 1 is in the emergency state during the flight of the UAV 1 or when a sensing instruction is issued from the UTMS 2 or GCS, performs sensing of the ground surface during the flight of the UAV 1 by using the camera or the like of the imaging unit 14, for example, according to a sensing program stored in the ROM or the non-volatile memory. At this time, the control unit 15 may continuously sense a range that can be detected by the camera or the like. The control unit 15 transmits the sensing data obtained by sensing the ground surface together with the aircraft ID and the aircraft information of the UAV 1 to the control server CS, for example, at predetermined time intervals via the wireless communication unit 13. The sensing data to be transmitted may be image data obtained by capturing with the imaging unit 14 or may be various types of data obtained by sensing with at least one sensor of the infrared sensor, the thermal sensor, the ultrasonic sensor, the photoelectric sensor, the laser sensor, the LiDAR, and the like. Incidentally, the control unit 15 may estimate its own position and generate environment map data (including three-dimensional shape data of the ground surface of the sensed range) by a SLAM (Simultaneous Localization And Mapping) using the current position detected by the positioning unit 12 and the sensing data obtained by sensing. In this case, the control unit 15 transmits the generated environment map data together with the aircraft ID and the aircraft information of the UAV 1 to the control server CS, for example, at predetermined time intervals via the wireless communication unit 13.

Moreover, the control unit 15 executes various controls of the UAV 1 according to control programs stored in, for example, the ROM or the non-volatile memory. The various controls include takeoff control, flight control, and landing control. In the flight control and the landing control, the position information acquired from the positioning unit 12, the image data acquired from the imaging unit 14, the detection information acquired from various sensors, the position information of the landing point, and a pre-registered flight plan information (including, for example, a planned flight route) are used to control the rotation rate of the rotor and control the position, the orientation, and the direction of travel of the UAV 1. Here, the position information of the landing point is the position information of a port (destination point) acquired from the PMS 3 or the position information of the emergency landing point acquired from the UTMS 2 or GCS. The position information of the landing point is represented by, for example, the latitude and longitude of the center of the point. The control unit 15 controls the UAV 1 to fly to the landing point (the destination point or the emergency landing point) according to the position information of the landing point and causes the UAV 1 to land at the landing point. Incidentally, the autonomous flight of the UAV 1 is not limited to the autonomous flight in which the control unit 15 provided in the UAV 1 performs flight control, but the autonomous flight of the UAV 1 includes, for example, the autonomous flight in which the unmanned aerial vehicle system S as a whole performs the flight control.

[1-2. Configuration and Function Outline of the Control Server CS]

Figure 3:
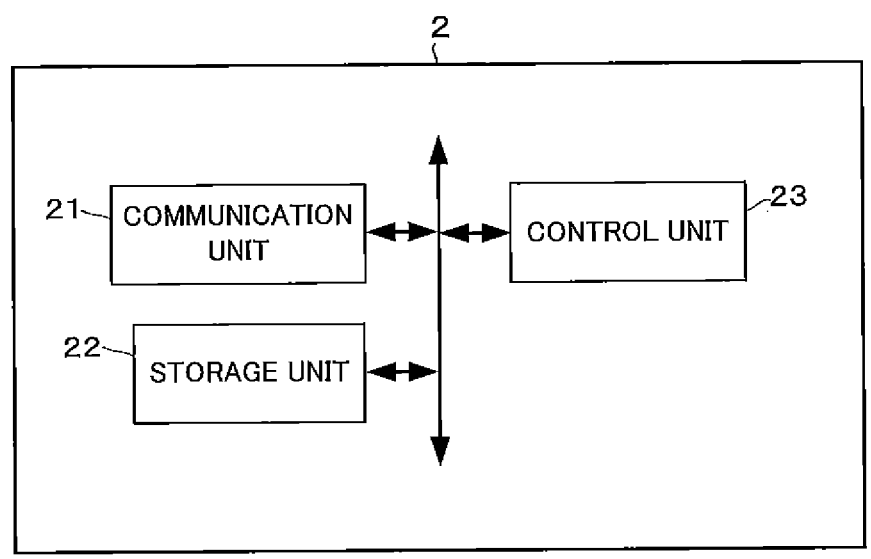
FIG. 3 is a diagram illustrating a schematic configuration example of a control server CS.
Figure 4:
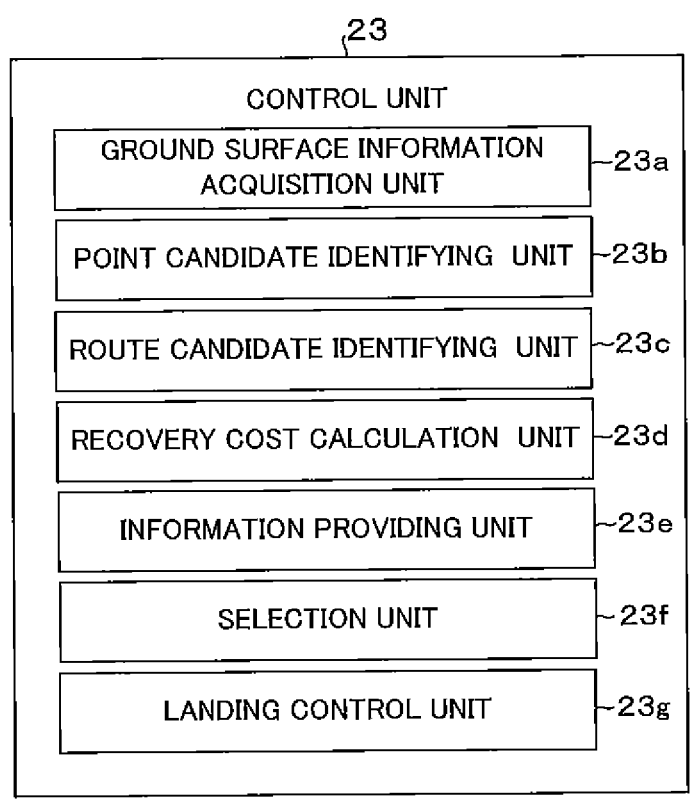
FIG. 4 is a diagram illustrating an example of a functional block in a control unit 23.

Next, the configuration and function outline of the control server CS will be described with reference to FIGS. 3 and 4. FIG. 3 is a diagram illustrating a schematic configuration example of the control server CS. As illustrated in FIG. 3, the control server CS includes a communication unit 21, a storage unit 22, a control unit 23, and the like. The communication unit 21 controls communication performed via a communication network NW. The storage unit 22 includes, for example, a hard disk drive and the like. The storage unit 22 stores the aircraft ID of the UAV 1, the flight plan information indicating the flight plan of the UAV 1, and the aircraft information of the UAV 1 in association with each other. Moreover, map information is stored in the storage unit 22. The map information includes, for example, latitude, longitude, altitude, and geology of each point in the map, as well as data such as buildings, roads (roadways), sidewalks, mountain roads, and forest roads. Incidentally, the map information may be acquired from, for example, a map providing service or the like outside the unmanned aerial vehicle system S.

The control unit 23 includes a CPU, which is a processor, a ROM, a RAM, a non-volatile memory, and the like. FIG. 4 is a diagram illustrating an example of a functional block in the control unit 23. As illustrated in FIG. 4, the control unit 23 functions as a ground surface information acquisition unit 23a, a point candidate identifying unit 23b, a route candidate identifying unit 23c, a recovery cost calculation unit 23d, information providing unit 23e, a selection unit 23f, and a landing control unit 23g according to a program stored in, for example, the ROM or the non-volatile memory. Incidentally, the route candidate identifying unit 23c is an example of the passage detection unit and the route candidate search unit. The information providing unit 23e is an example of the presentation unit. The selection unit 23f is an example of the landing point selection unit and the recovery route selection unit.

The ground surface information acquisition unit 23a acquires information (hereinafter, referred to as the "ground surface information") of a ground surface in a predetermined area, for example, when the emergency state information is received from the UAV 1 which is in the emergency state. The predetermined area is an area related to recovery of the UAV 1 (hereinafter referred to as the "recovery area"). The recovery area includes, for example, a range sensed by the UAV 1 and at least one of a recovery start point (start point for recovery) for recovery of the UAV 1 and a recovery return point (return point for recovery). The recovery start point and the recovery return point are both examples of reference points related to recovery. The recovery return point is the point to which the recovered (collected) UAV 1 is transported. For example, the recovery return point may be a point where a warehouse that houses the UAV 1 or equipment capable of repairing the UAV 1 exists. Incidentally, the recovery return point may be the same as or different from the recovery start point. Here, the recovery means any one of the following: (i) the recoverer goes from the recovery start point to the emergency landing point, acquires (for example, picks up) the UAV 1, carries the UAV 1, and returns to the recovery return point (that is, corresponding to outward trip and return trip), (ii) the recoverer goes from the recovery start point to the emergency landing point, acquires the UAV 1 (that is, only corresponding to the outward trip), and (iii) the recoverer acquires the UAV 1 at the emergency landing point, carries the UAV 1, and returns to the recovery return point (that is, only corresponding to the return trip). For example, in the case of (i), the recoverer may go from the recovery start point to the emergency landing point, acquire the UAV 1, and then return (go back) to the recovery return point, which is the same as the recovery start point, or may return to the recovery return point, which is different from the recovery start point. The recoverer may be an operator of the UAV 1 or may be a person other than the operator. Moreover, the recoverer may use a recovery vehicle traveling on the road to recover the UAV 1. Both the recovery start point and the recovery return point may be manually registered by the operator of the UAV 1 or the like after or before the emergency state information is received, or may be automatically registered as the current position detected by a GPS function of the operation terminal T used by the operator.

The ground surface information includes at least one of the three-dimensional shape data of the ground surface in the recovery area and a ground surface attribute in the recovery area, and is associated with the position information of each point on the ground surface. The three-dimensional shape data may be acquired from the environment map data received from the UAV 1 or may be acquired from the environment map data generated by the control unit 23. In the latter case, for example, the ground surface information acquisition unit 23a generates environmental map data by SLAM using the position information and the sensing data received from the UAV 1. Moreover, the three-dimensional shape data may be complemented by the map information corresponding to the recovery area within the map information stored in the storage unit 22. In particular, the three-dimensional shape data in the area outside the range sensed by the UAV 1 within the recovery area is acquired from the map information. When the environment map data has been generated in the past in the overlapping area and stored in the storage unit 22, the current three-dimensional shape data may be complemented on the basis of the past three-dimensional shape data. Incidentally, the environment map data may be generated on the basis of sensing by, for example, the UAV 1 or another aircraft that flew in the past.

The ground surface attribute of the ground surface in the recovery area is estimated on the basis of, for example, the sensing data received from the UAV 1. As described above, well-known techniques such as image recognition and machine learning can be used as a method for estimating the ground surface attribute on the basis of the sensing data. The ground surface attribute may be estimated by being classified into one or more ground surface attributes among a plurality of attributes such as concrete, water, soil, lawn, sand, and trees. By estimating the ground surface attribute on the basis of the sensing data, it is possible to appropriately estimate the ground surface attribute that can change from moment to moment, such as puddles. For example, the ground surface information acquisition unit 23a generates mapping image data of the ground surface in the recovery area on the basis of the sensing data. The mapping image data is mainly generated on the basis of the image data captured by the camera. Moreover, in the mapping image data, for example, a color (RGB value), a latitude, and a longitude are associated with each point (pixel) of the mapping image data. Moreover, when the camera, the infrared sensor, or the like is used for sensing the ground surface, each point of the mapping image data is associated with the radiation temperature of each point in addition to the color, latitude, and longitude. Moreover, when the camera, the photoelectric sensor, or the like is used for sensing the ground surface, each point of the mapping image data is associated with the light reflectance of each point in addition to the color, latitude, and longitude.

Incidentally, the ground surface attribute may be complemented by the map information corresponding to the recovery area within the map information stored in the storage unit 22. In particular, the ground surface attribute in the area outside the range sensed by the UAV 1 within the recovery area is acquired from the map information. By estimating the ground surface attribute on the basis of the map information, it is possible to accurately estimate matters that do not change much, such as roads and the sea.

The point candidate identifying unit 23*b* identifies (for example, identifies by position information) one or a plurality of landing point candidates that are candidates for the emergency landing point for causing the UAV 1 flying toward the destination point to make an emergency landing to a point other than the destination point. For example, the point candidate identifying unit 23*b* identifies one or a plurality of landing point candidates suitable for landing of the UAV 1 on the basis of the ground surface information acquired by the ground surface information acquisition unit 23*a*. Consequently, it is possible to accurately identify the landing point candidate suitable (preferable) for landing of the UAV 1. The landing point candidate suitable for landing of the UAV 1 includes at least one of a landing point candidate where the UAV 1 can make an easy landing, a landing point candidate where the UAV 1 is unlikely to be damaged, a landing point candidate where the recoverer can easily find the UAV 1, and a landing point candidate where the recoverer can easily take the UAV 1. For example, an area where a land area has a size equal to or larger than a threshold value (for example, several tens of m$^2$) (that is, an area having a size suitable for landing of the UAV 1) is identified as the landing point candidate. Here, the threshold value of the land area is set in advance mainly from the viewpoint of easiness of landing of the UAV 1, and can be changed as needed. Incidentally, the threshold value of the land area may be set on the basis of, for example, the plane size of the UAV 1. Alternatively, an area where a land area has a size equal to or larger than the threshold value and a gradient is less than a threshold value (for example, several %) (that is, an area having a small inclination suitable for landing of the UAV 1) may be identified as the landing point candidate. Here, the gradient is, for example, the value obtained by dividing the vertical distance by the horizontal distance (unit distance) (=vertical distance/horizontal distance) as a percentage (however, the inclination of the surface with respect to the horizontal plane may be expressed by an angle). The threshold value of the gradient is set mainly from the viewpoint of easiness of landing of the UAV 1 and easiness of recovery of the UAV 1 by the recoverer, and can be changed as needed.

Moreover, in identifying the landing point candidate suitable for landing, the priority level (priority) of the ground surface attribute may be taken into consideration together with the land area and the gradient. The priority level of the ground surface attribute is set in advance mainly from the viewpoint that the UAV 1 is less likely to be damaged and the recoverer can easily acquire the UAV 1, for example, soil (priority level: 10), lawn (priority level: 9), concrete (priority level: 8), sand (priority level: 7), road (priority level: 3), water (priority level: 2), and trees (priority level: 1) (for example, the larger the number, the more it is easy to be identified as the landing point candidate with priority), and can be changed as needed. In this case, within the area where the land area has a size equal to or larger than the threshold value (or the area where the land area has a size equal to or larger than the threshold value and the gradient is less than the threshold value), the area having the ground surface attribute (e.g., soil and lawn) whose priority level is equal or more than the threshold value (for example, 9) is identified as the landing point candidate. If there is no such area and no landing point candidates can be identified, the threshold value of the priority level is set low (e.g., set to less than 9), and the area having the ground surface attribute (e.g., concrete and sand) whose priority level is set low and equal to or larger than the threshold value is identified as the landing point candidate.

Incidentally, in identifying the landing point candidate suitable for landing, the threat level with respect to threats on the ground may be taken into consideration together with the land area and the gradient. The threat level is a parameter that quantifies the degree to which the UAV 1 should avoid contact. The threat level is set, for example, for each target that should be avoided from being damaged by contact with the UAV 1. Examples of such a target include people, objects (buildings, vehicles, or the like), lawns, trees, puddles, and the like. For example, people and objects are set with a relatively high threat level, and lawns, trees, and water fields are set with a relatively low threat level. In this case, the area having the threat level of equal to or less than the threshold value is identified as the landing point candidate from the area where the land area has a size equal to or larger than the threshold value (or the area where the land area has a size equal to or larger than the threshold value and the gradient is less than the threshold value). Moreover, in identifying the landing point candidate suitable for landing, whether the site (place) is a private land may be taken into consideration together with the land area and the gradient. In this case, the area that is not a private land is identified as the landing point candidate from the area where the land area has a size equal to or larger than the threshold value (or the area where the land area has a size equal to or larger than the threshold value and the gradient is less than the threshold value).

Moreover, the point candidate identifying unit 23*b* may search for one or more landing point candidates included in the search range set on the basis of the current position of the UAV 1. Consequently, it is possible to identify a landing point candidate that the UAV 1 can easily reach. The search range is, for example, a circular (or rectangular) range centered on the current position of the UAV 1, and a range narrower than the above-mentioned recovery area. The circular has, for example, a radius of several tens of meters to several kilometers. For example, the point candidate identifying unit 23*b* may search for one or more landing point candidates included in the aforementioned set search range from the landing point candidates identified on the basis of the ground surface information in the recovery area, and may finally identify the landing point candidates found by the search. However, the point candidate identifying unit 23*b* may search for one or more landing point candidates included in the search range on the basis of the ground surface information of the above search range from the beginning and identify one or more landing point candidates. Moreover, when one or more the landing point candidates cannot be identified by the search (that is, when one or more landing point candidates cannot be found within the set search range), the point candidate identifying unit 23*b* may perform re-setting to expand the search range (for example, expand the radius from 1 km to 3 km), re-search for one or more landing point candidates included in the re-set search range, and finally identify one or more landing point candidates found by the re-search. Such re-setting of the search range may be repeated until the landing point candidate is found.

Moreover, the point candidate identifying unit 23*b* may set the search range according to at least one of the details of the emergency state, the type of the emergency state, and the level of the emergency state which are included in the emergency state information received from the UAV 1. Consequently, it is possible to identify a landing point candidate that can be easily reached by the UAV 1 according to the urgency of the UAV 1. For example, when the flyable distance can be predicted according to an abnormality (for example, insufficient battery level) that occurred in the UAV 1, the search range is set according to the flyable distance, that is, the shorter the flyable distance, the narrower the search range is set. Here, the flyable distance indicates how much distance the UAV 1 in the emergency state can fly. Moreover, when the search range is set according to the level of the emergency state, the higher the level of the emergency state, the narrower the search range is set. Incidentally, the identified one or more landing point candidates (that is, the position information of one or more landing point candidates) is stored in the memory in association with, for example, at least one piece of information of the road width, the gradient, and the ground surface attribute.

The route candidate identifying unit 23c detects (for example, detects by the position information) a passage suitable for recovering the UAV 1 from the recovery area on the basis of the ground surface information acquired by the ground surface information acquisition unit 23a. Here, the passage includes a first passage (roadway) that both the recoverer and the recovery vehicle can pass through, and a second passage (sidewalk, mountain road, forest road, animal trail) that only the recoverer out of the recoverer and the recovery vehicle can pass through. Among them, the passage suitable for recovery of the UAV 1 corresponds to at least one of a passage where the recoverer can easily walk, a passage where the recoverer can easily carry the UAV 1, and a passage where the recovery vehicle can easily travel. For example, a passage whose road width is equal to or larger than a threshold value (for example, several tens of cm) is detected. Alternatively, a passage which has a road width of equal to or larger than the threshold value and has a gradient of less than the threshold value (for example, several %) may be detected. The threshold value of the road width and the threshold value of the gradient are set mainly from the viewpoint of a passage where the recoverer can walk easily and the UAV 1 can be carried easily or easiness of travel of the recovery vehicle, and can be changed as needed.

Moreover, in detecting the passage suitable for the recovery, the priority level of the ground surface attribute may be taken into consideration together with the land area and the gradient. The priority level of the ground surface attribute is set in advance mainly from the viewpoint that the recoverer can easily walk and the UAV 1 can be easily carried or the recovery vehicle can easily travel, for example, road (priority level: 10), concrete (priority level: 9), soil (priority level: 8), lawn (priority level: 7), sand (priority level: 6), water (priority level: 1), and trees (priority level: 0), and can be changed as needed. In this case, among the passages having a road width of equal to or larger than the threshold value (or passages having a road width of equal to or larger than the threshold value and gradient of less than the threshold value), a passage having the ground surface attribute (for example, road, concrete) having a priority level equal to or higher than the threshold value (for example, 9) is detected. If such passage cannot be detected, the threshold value of the priority level is set low (e.g., set to less than 8), and the passage having the ground surface attribute (e.g., road, concrete, and soil) whose priority level is set low and equal to or higher than the threshold value is detected. Moreover, in detecting the passage suitable for the recovery, whether the site (place) is a private land may be taken into consideration together with the land area and the gradient. In this case, among passages having a road width of equal to or higher than the threshold value (or passages having a road width of equal to or higher than the threshold value and a gradient of less than the threshold value), a passage that does not pass through a private land is detected. Incidentally, the detected passage (that is, the position information on the passage) is stored in the memory in association with, for example, at least one piece of information of the road width, the gradient, and the ground surface attribute.

Figure 5:
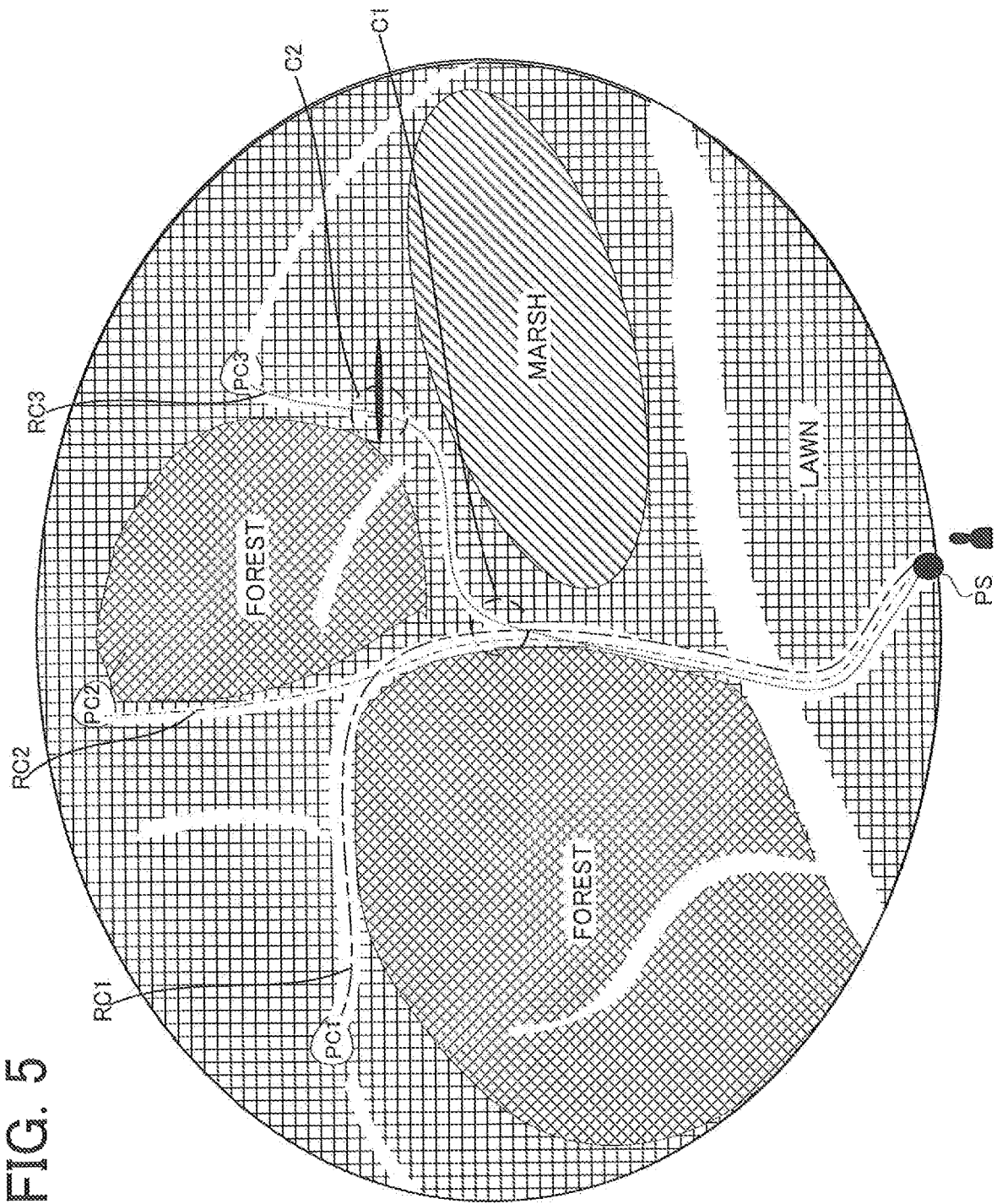
FIG. 5 is a diagram illustrating a recovery route candidate formed by connecting a plurality of detected passages.

The route candidate identifying unit 23c searches for a recovery route candidate connecting the reference point and the landing point candidate on the basis of the passage detected as described above, and identifies (for example, identifies by the position information) one or a plurality of recovery route candidates found by the search. The route candidate identifying unit 23c may search for not only the recovery route candidate formed by one detected passage, but also the recovery route candidate formed by connecting a plurality of detected passages (for example, passages separated from each other). Consequently, it is possible to identify more recovery route candidates. FIG. 5 is a diagram illustrating a recovery route candidate formed by connecting a plurality of detected passages. As illustrated in FIG. 5, there is a case where the plurality of detected passages are directly connected (C1 part shown in FIG. 5) and there is a case where the plurality of detected passages are connected through a part not detected as a passage (C2 part shown in FIG. 5). Moreover, the example of FIG. 5 shows an example in which a plurality of landing point candidates PC1 to PC3 are identified by the route candidate identifying unit 23c. In this case, recovery route candidates RC1 to RC3 connecting each of the landing point candidates PC1 to PC3 and a recovery start point PS (=recovery return point) will be searched. Incidentally, when searching for a recovery route candidate formed by connecting a plurality of detected passages, the number of the recovery route candidates can be enormous, and therefore the upper limit (for example, 10) of the recovery route candidates to be searched may be set.

Moreover, for one landing point candidate, a plurality of recovery route candidates connecting the landing point candidate and the reference point may be searched (a plurality of different recovery route candidates may be searched). Consequently, it is possible to provide the recoverer with various recovery route candidates. Further, the recovery route can be different between the outward trip from the recovery start point to the emergency landing point and the return trip from the emergency landing point to the recovery return point. Moreover, the route candidate identifying unit 23c may search for a recovery route candidate so that, among the first passage that both the recoverer and the recovery vehicle can pass through and the second passage that only the recoverer out of the recoverer and the recovery vehicle can pass through, the first passage is prioritized. For example, when both passages of the first passage and the second passage can be used to form a recovery route candidate, even when the distance of the second passage is longer than that of the first passage, when the distance difference is equal to or less than a predetermined distance, a recovery route candidate using the first passage is searched. Consequently, because the recoverer can efficiently use a recovery vehicle when recovering the UAV 1, it is possible to reduce the load and time required for the recovery of the UAV 1. However, when there are circumstances such as incurring of charges for using the first passage (for example, when it can be recognized as a toll road from the map information), the recovery route candidate is searched so that the second passage is prioritized among the first passage and the second passage.

Incidentally, the identified recovery route candidate (for example, position information on the recovery route candidate) is stored in the memory in association with, for example, at least one piece of information of the road width, the gradient, and the ground surface attribute of one or more passages forming the recovery route candidate. Here, the at least one piece of information of the road width, the gradient, and the ground surface attribute of the passage may be stored separately for each position x at predetermined intervals on the passage. Moreover, when the recovery route candidate is formed by a plurality of passages, the recovery route candidate (for example, position information on the recovery route candidate) is stored in the memory in association with the connection status between the passages. Here, the connection status indicates whether or not the passages are directly connected, and, when the passages are connected through a part that is not detected as a passage, indicates the attributes (for example, cliff or the like), the degree of difficulty to pass through, or the like of the part.

The recovery cost calculation unit 23d calculates a recovery cost regarding the recovery route candidate identified by the route candidate identifying unit 23c. Here, the recovery cost is information indicating at least one of the load (for example, the labor of the recoverer), the time, and the risk (risk level) required for the recovery of the UAV 1. The recovery cost may be configured so that its degree is represented by humanly identifiable information (e.g., pattern, symbol, color, or the like) or may be quantified (e.g., a number between 1 and 10). Alternatively, the recovery cost may be a value (that is, one of the two values) indicating whether the UAV 1 can be recovered only via the recovery route candidate (in other words, whether the landing point candidate can be reached from the recovery start point). Although the recovery route candidate is searched, for example, when it is extremely difficult to pass depending on the connection status between the passages, the recovery cost would become very high (for example, infinite). Therefore, the recovery cost is calculated so as to indicate whether or not the UAV 1 can be recovered with the threshold value as a boundary. Incidentally, the recovery cost is used to determine the emergency landing point or the recovery route connecting the reference point and the emergency landing point.

In calculating the recovery cost, the recovery cost calculation unit 23d calculates the distance of the recovery route candidate identified by the route candidate identifying unit 23c, for example, on the basis of the position information on the recovery route candidate. Here, the distance of the recovery route candidate is a moving distance (hereinafter, referred to as the "recovery distance") for recovering the UAV 1 according to the recovery route candidate. Then, the recovery cost calculation unit 23d calculates the recovery cost regarding the recovery route candidate on the basis of the calculated recovery distance. For example, the longer the recovery distance, the higher (larger) the recovery cost is calculated. In other words, the shorter the recovery distance, the lower (smaller) the recovery cost is calculated. Consequently, it is possible to calculate an appropriate recovery cost commensurate with the distance of the recovery route candidate. Incidentally, the recovery distance may be a one-way distance or a round-trip distance.

Moreover, the recovery cost calculation unit 23d may calculate the recovery cost regarding the recovery route candidate on the basis of the parameter representing the feature amount in the recovery route candidate instead of the recovery distance or together with the recovery distance. Consequently, it is possible to calculate an appropriate recovery cost commensurate with the feature amount in the recovery route candidate. The parameter representing the feature amount in the recovery route candidate is a parameter indicating how suitable the recovery route candidate is for recovery. The parameter includes at least one of the size of the road width of one or more passages forming the recovery route candidate, the magnitude of the gradient, the priority level of the ground surface attribute, and the connection status between the passages. For example, the narrower the road width, the higher the recovery cost is calculated. Moreover, the larger the gradient, the higher the recovery cost is calculated. Moreover, the lower the priority level of the ground surface attribute, the higher the recovery cost is calculated. Moreover, the higher the difficulty of passing indicated by the connection status, the higher the recovery cost is calculated. Incidentally, the above parameters may include whether or not it is a private land. In this case, the recovery cost is calculated high when the recovery route candidate passes through the private land.

Figure 6:
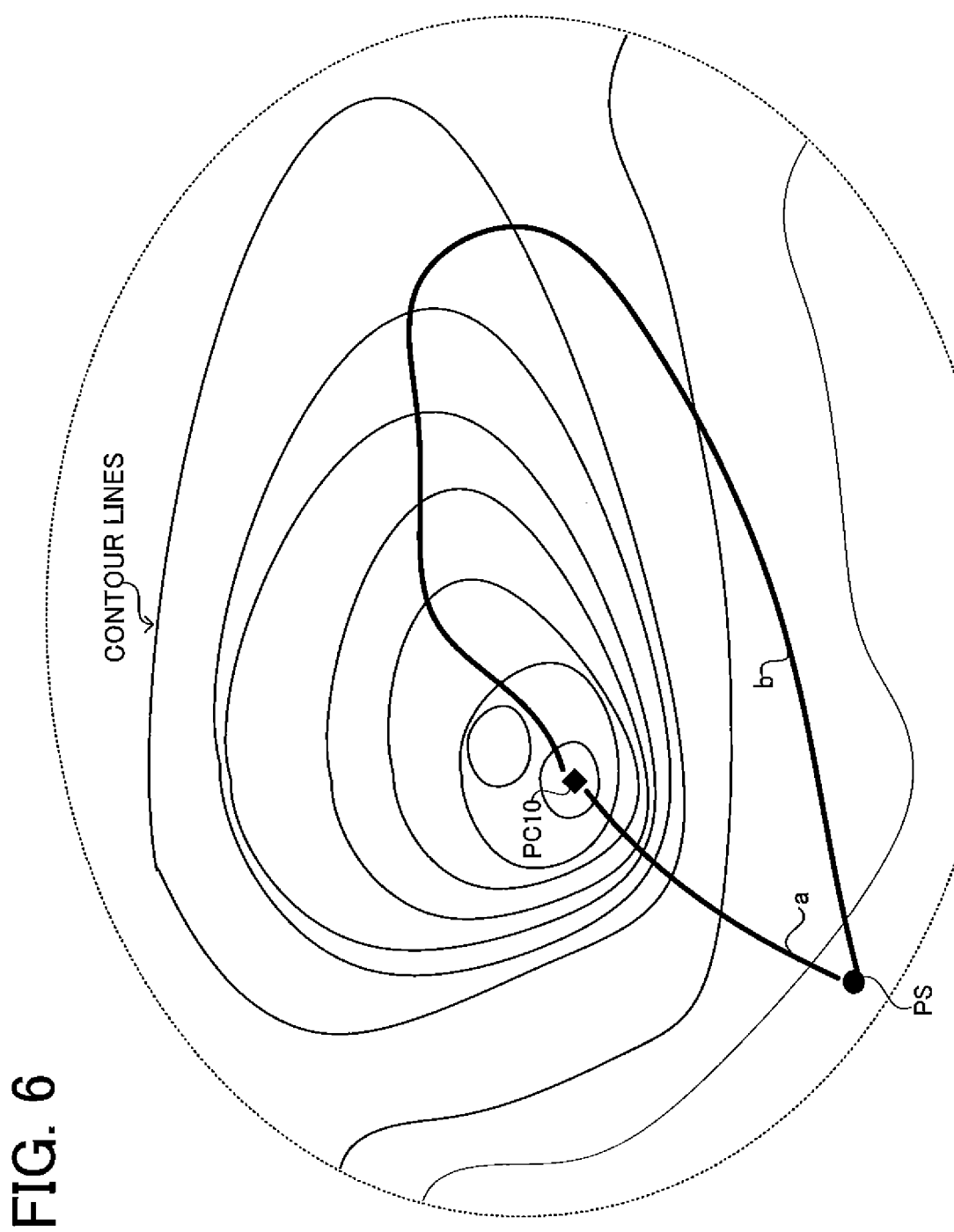
FIG. 6 is a conceptual diagram illustrating two different routes a and b connecting a recovery start point PS and a landing point candidate PC10 together with contour lines.

Moreover, the recovery cost calculation unit 23d may calculate the recovery cost by distinguishing between the outward trip and the return trip in the recovery route candidate. That is, even when the same trajectory is followed, different recovery costs are calculated for the outward trip and the return trip. Consequently, it is possible to calculate the recovery cost in consideration of the recoverer carrying the UAV 1 on the return trip. This is because the recoverer carries the UAV 1 on the return trip, the load on the recovery is greater than on the outward trip. For example, as described above, the larger the gradient, the higher the recovery cost is calculated, but the recovery cost is calculated higher on the return trip than on the outward trip. For example, while the recovery cost is calculated as 10 when the gradient is 7% on the outward trip, the recovery cost is calculated as 20 when the gradient is 7% on the return trip. Consequently, it is possible to use a detour route as a return trip, which has a longer recovery distance than the outward trip but has a small load on the recoverer. FIG. 6 is a conceptual diagram illustrating two different routes a and b connecting the recovery start point PS and a landing point candidate PC10 together with contour lines. In the example of FIG. 6, the distance of the route a is shorter than that of the route b, but the gradient of the route a is larger than that of the route b. Therefore, the recovery cost when the route a is used as the outward trip is smaller than the recovery cost when the route b is used as the outward trip, while the recovery cost when the route a is used as the return trip can be larger than the recovery cost when the route b is used as the return trip (that is, reversed).

Moreover, the recovery cost regarding the recovery route candidate may be the sum of the recovery costs calculated for at least two of the following parameters: the size of the road width, the magnitude of the gradient, the priority level of the ground surface attribute, and the connection status between the passages. Moreover, the recovery cost regarding the recovery route candidate may be the sum of the recovery costs calculated based on the above parameters for each passage forming the recovery route candidate, or the sum of the recovery costs calculated based on the above parameters for each position x at predetermined intervals on the passage forming the recovery route candidate. The recovery cost regarding the recovery route candidate in this case is calculated by, for example, the following formula (1).

[Math. 1]

$$\text{RECOVERY COST} = \int_{PS}^{PCI} f(x)\,dx \tag{1}$$

Here, f(x) indicates the sum (that is, the sum of the costs at the position x) of the recovery costs calculated for each parameter at each position x on the passage forming the recovery route candidate connecting the recovery start point PS and the landing point candidate PC1. The integral of such f(x) from the recovery start point PS to the landing point candidate PC1 is finally calculated as the recovery cost regarding the recovery route candidate. However, when the parameter takes a negative value, the absolute value of the parameter is the target of integration. Incidentally, the recovery costs for each of the outward trip and the return trip in the recovery route candidate may be calculated by the formula (1), and the sum of them may be calculated as the recovery cost regarding the recovery route candidate. Further, the recovery cost calculation unit 23d may add the recovery cost calculated based on the recovery distance to the sum of the recovery costs calculated for each parameter as described above to calculate the recovery cost (final recovery cost) regarding the recovery route candidate.

Incidentally, when a plurality of landing point candidates are identified by the point candidate identifying unit 23b, the recovery cost calculation unit 23d calculates the recovery cost for each of the plurality of landing point candidates. Consequently, it is possible to achieve determination of a landing point by comparing the recovery costs for each of a plurality of landing point candidates. Moreover, when a plurality of recovery route candidates are identified by the route candidate identifying unit 23c, the recovery cost calculation unit 23d calculates the recovery cost for each of the plurality of recovery route candidates. Consequently, it is possible to achieve determination of a recovery route by comparing the recovery costs for each of a plurality of recovery route candidates. When there is a one-to-one correspondence between the landing point candidate and the recovery route candidate, the recovery cost for each of the plurality of recovery route candidates is the recovery cost for each of landing point candidates corresponding (connected) to each of the plurality of recovery route candidates. That is, in this case, the number of recovery costs is one for one landing point candidate. On the other hand, when there is one-to-N(N>2) correspondence between the landing point candidate and the recovery route candidates, the recovery cost for each of N recovery route candidates is the recovery cost for one landing point candidate corresponding (connected) to the N recovery route candidates. That is, in this case, the number of recovery costs is N for one landing point candidate.

The information providing unit 23e performs presentation processing of presenting the presentation information including the recovery cost (information representing the recovery cost) calculated by the recovery cost calculation unit 23d to the operator of the UAV 1. By this presentation processing, the presentation information is transmitted to the operation terminal T used by the operator of the UAV 1 and displayed on the display screen of the operation terminal T. The presentation information may include the recovery distance instead of the recovery cost or together with the recovery cost. Further, the presentation information may include map information indicating the position of the landing point candidate identified by the point candidate identifying unit 23b and the position (trajectory) of the recovery route candidate identified by the route candidate identifying unit 23c.

Moreover, when a plurality of landing point candidates are identified by the point candidate identifying unit 23b, the presentation information including the recovery cost calculated for each of the landing point candidates is transmitted to the operation terminal T used by the operator of the UAV 1 and presented to the operator of the UAV 1. This presentation information includes request information for designating (selecting) any one landing point candidate of the plurality of landing point candidates the emergency landing point. With this configuration, the request information is displayed on the display screen of the operation terminal T together with the recovery cost for each of the landing point candidates. Then, when the operator of the UAV 1 designates (specifies) any one landing point candidate in response to the request information, the designation information indicating the landing point candidate designated by the operator of the UAV 1 is transmitted to the control server CS.

FIG. 7 is a diagram illustrating an example of a display screen on which the request information for designating a landing point candidate is displayed. In the example of FIG. 7, a map showing the landing point candidates PC1 to PC3 and recovery route candidates from the respective landing point candidates PC1 to PC3 to the recovery start point (=recovery return point) is displayed. Further, a window (an example of the request information) is pop-up displayed so as to be capable of designation at each position of the landing point candidates PC1 to PC3 on the map. The name "Candidate 1" of the landing point candidate PC1 and the recovery cost "Medium" are displayed in the window corresponding to the landing point candidate PC1, the name "Candidate 2" of the landing point candidate PC2 and the recovery cost "Small" are displayed in the window corresponding to the landing point candidate PC2, and the name "Candidate 3" of the landing point candidate PC3 and the recovery cost "Large" are displayed in the window corresponding to the landing point candidate PC3. Using these windows, the operator of the UAV 1 can compare the magnitude (high and low) of the recovery costs of the landing point candidates PC1 to PC3 and designate a desired landing point candidate. For example, the operator can click or tap the window corresponds to the landing point candidate PC2 with the lowest recovery cost. With this configuration, the designation information indicating the designated landing point candidate is transmitted to the control server CS. Incidentally, in the example of FIG. 7, the recovery cost is represented by large, medium, and small, but may be represented numerically.

Incidentally, when there is one-to-N(N>2) correspondence between the landing point candidate and the recovery route candidates, the presentation information including the recovery cost calculated for each of the N landing point candidates for one landing point candidate is transmitted to the operation terminal T used by the operator of the UAV 1 and presented to the operator of the UAV 1. This presentation information includes request information for designating (selecting) any one recovery route candidate of the plurality of recovery route candidates as a recovery route. With this configuration, the request information is displayed on the display screen of the operation terminal T together with the recovery cost for each of the recovery route candidates. Then, when the operator of the UAV 1 designates any one recovery route candidate according to the request information, the designation information indicating the recovery route candidate designated by the operator of the UAV 1 is transmitted to the control server CS.

When the designation information indicating the landing point candidate designated by the operator of the UAV 1 is received via the communication unit 21, the selection unit 23f selects any one landing point candidate of the plurality of landing point candidates as the emergency landing point on the basis of the designation of the landing point candidate by the operator. Consequently, it is possible to determine the emergency landing point desired by the operator from a plurality of landing point candidates. Here, when there is a one-to-one correspondence between the landing point candidate and the recovery route candidate, when any one landing point candidate is determined as the emergency landing point, the recovery route candidate corresponding to the landing point candidate is determined as a recovery route for recovery of the UAV 1. Alternatively, when the designation information indicating the recovery route candidate designated by the operator of the UAV 1 is received via the communication unit 21, the selection unit 23*f* selects any one recovery route candidate of the plurality of recovery route candidates as a recovery route on the basis of the designation of the recovery route candidate by the operator. Consequently, it is possible to determine a recovery route desired by the operator from a plurality of recovery route candidates. In this way, when any one of the recovery route candidates is determined as the recovery route, the landing point candidate corresponding to the recovery route candidate is determined as the emergency landing point.

Alternatively, instead of selecting the emergency landing point on the basis of the designation of the landing point candidate by the operator, the emergency landing point may be automatically configured to be selected from the plurality of landing point candidates. In this case, the selection unit 23*f* selects any one landing point candidate of the plurality of landing point candidates as the emergency landing point on the basis of the recovery cost calculated for each of the plurality of landing point candidates. Consequently, it is possible to quickly determine the emergency landing point from the plurality of landing point candidates. For example, among the plurality of landing point candidates, the landing point candidate having the lowest recovery cost is selected as the emergency landing point. With this configuration, the emergency landing point is determined. Then, when there is a one-to-one correspondence between the landing point candidate and the recovery route candidate, the recovery route candidate corresponding to the landing point candidate is determined as a recovery route for recovery of the UAV 1 by the above determination. Alternatively, the selection unit 23*f* selects any one recovery route candidate of the plurality of recovery route candidates as the recovery route on the basis of the recovery cost calculated for each of the plurality of recovery route candidates. Consequently, it is possible to quickly determine a recovery route from a plurality of recovery route candidates. In this way, when any one of the recovery route candidates is determined as the recovery route, the landing point candidate corresponding to the recovery route candidate is determined as the emergency landing point.

Incidentally, when the recovery cost is calculated based only on the recovery distance, among the plurality of landing point candidates, the landing point candidate having the shortest recovery distance is selected as the emergency landing point. In this case, the selection unit 23*f* may select the emergency landing point further on the basis of the positional relationship between the current position of the UAV 1 and the landing point candidate. For example, the selection unit 23*f* calculates the landing point cost using the formula (2) described below on the basis of both the flight distance from the current position of the UAV 1 to the landing point candidate and the recovery distance from the landing point candidate to the reference point regarding each of the plurality of landing point candidates. Then, the selection unit 23*f* selects any one landing point candidate of the plurality of landing point candidates as the emergency landing point on the basis of the calculated landing point cost. For example, among the plurality of landing point candidates, the landing point candidate having the lowest landing point cost is selected as the emergency landing point.

Consequently, it is possible to quickly determine the emergency landing point that the UAV 1 can easily reach from a plurality of landing point candidates.

$$\text{Landing point cost} = a(\text{coefficient}) \times \text{flight distance} + b(\text{coefficient}) \times \text{recovery distance} \qquad (2)$$

Similarly, when the recovery cost is calculated based only on the recovery distance, the recovery route candidate having the shortest recovery distance is selected as the recovery route among the plurality of recovery route candidates. In this case as well, the selection unit 23*f* may select the recovery route further on the basis of the positional relationship between the current position of the UAV 1 and the landing point candidate corresponding (connected) to the recovery route candidate. For example, the selection unit 23*f* calculates the landing point cost regarding each of the plurality of recovery route candidates using the formula (2) described above on the basis of both the flight distance from the current position of the UAV 1 to the landing point candidate corresponding to the recovery route candidate and the recovery distance of the recovery route candidate. Then, the selection unit 23*f* selects any one recovery route candidate of the plurality of recovery route candidates as the recovery route on the basis of the calculated landing point cost. For example, among the plurality of recovery route candidates, the recovery route candidate having the lowest landing point cost is selected as the recovery route.

The landing control unit 23*g* controls the UAV 1 to land at the emergency landing point on the basis of the position information of the emergency landing point determined by the selection of the selection unit 23*f*. For example, the landing control unit 23*g* transmits the position information of the emergency landing point to the UAV 1 which is in the emergency state, via the communication network NW. With this configuration, the UAV 1 autonomously flies toward the emergency landing point on the basis of the position information of the emergency landing point, and makes an emergency landing at the emergency landing point. Alternatively, the landing control unit 23*g* transmits the position information of the emergency landing point to the operation terminal T used by the operator of the UAV 1 which is in the emergency state, via the communication network NW. With this configuration, the UAV 1 flies toward the emergency landing point by the operation from the operation terminal T and makes an emergency landing at the emergency landing point.

[2. Operation of the Unmanned Aerial Vehicle System S]

Next, an operation example of the unmanned aerial vehicle system S according to the present embodiment will be described with reference to FIG. 8. FIG. 8 is a sequence diagram illustrating an example of the operation of the unmanned aerial vehicle system S after the UAV 1 is in the emergency state. Incidentally, the operation example described below shows the operation of a case where the emergency landing point and the recovery route are selected on the basis of the designation by the operator of the UAV 1. The operator of the UAV 1 shall be the recoverer of the UAV 1. Moreover, the recovery start point and the recovery return point shall be the same.

In FIG. 8, when the UAV 1 flying toward the destination point is determined to be in the emergency state due to abnormality detection, the emergency state information is transmitted to the operation terminal T and the control server CS together with the aircraft ID and the aircraft information of the UAV 1 (step S1).

When the operation terminal T receives the emergency state information from the UAV 1, the operation terminal T transmits recovery start point information indicating the recovery start point to the control server CS (step S2). Here, the recovery start point may be designated by the operator of the operation terminal T (for example, designated on the map displayed on the operation terminal T) or may be the current position detected by the GPS function of the operation terminal T.

Next, the UAV 1 starts sensing the ground surface during the flight of the UAV 1 using the camera or the like of the imaging unit 14 (step S3) and transmits the sensing data obtained by the sensing to the control server CS together with the aircraft ID and the aircraft information of the UAV 1 (step S4). Incidentally, the sensing by the UAV 1 and the transmission of the sensing data may be performed, for example, constantly or periodically (at predetermined intervals) even before occurrence of the emergency state.

When the control server CS receives the recovery start point information from the operation terminal T, the control server CS registers the recovery start point (step S5). Next, when the control server CS receives the emergency state information and the sensing data from the UAV 1, for example, the control server CS sets the recovery area including the range sensed by the UAV 1 and the registered recovery start point, and acquires the ground surface information of the recovery area (step S6).

Next, the control server CS sets the search range according to at least one of the details of the emergency state, the type of the emergency state, and the level of the emergency state included in the received emergency state information (step S7). For example, the search range according to the flyable distance of the UAV 1 is set. Next, the control server CS searches for landing point candidates included in the search range set in step S7 based on the ground surface information acquired in step S6 (step S8). For example, one or more landing point candidates are searched according to a threshold value (for example, the threshold value of the land area or the threshold value of the gradient) for searching for landing point candidates suitable for landing of the UAV 1.

Next, the control server CS determines whether or not a predetermined number (for example, one) or more of landing point candidates have been identified by the search in step S8 (step S9). When the predetermined number or more of landing point candidates have been identified (step S9: YES), the control server CS proceeds to step S11. On the other hand, when the predetermined number or more of landing point candidates have not been identified (step S9: NO), the control server CS performs re-setting to expand the above search range (step S10), returns to step S8, and re-searches for landing point candidates included in the re-set search range.

Incidentally, when the re-set search range exceeds the recovery area, information indicating that there is no landing point candidate may be transmitted to the operation terminal T. Alternatively, when the re-set search range exceeds the recovery area, the threshold value for searching for landing point candidates suitable for landing of the UAV 1 may be changed so as to be relaxed (for example, the threshold value of the land area may be lowered or the threshold value of the gradient may be increased). In this case, the control server CS performs setting to restore the search range, returns to step S8, and re-searches for landing point candidates according to the relaxed threshold value.

In step S11, the control server CS detects a passage suitable for recovery of the UAV 1 from the recovery area on the basis of the ground surface information acquired in step S6. For example, a passage suitable for recovery is detected according to the threshold value (for example, the threshold value of the road width or the threshold value of the gradient) for detecting a passage suitable for recovery of the UAV 1. Next, the control server CS searches for, from the recovery area, a recovery route candidate connecting the recovery start point registered in step S5 and the landing point candidate identified in step S9 on the basis of the passage detected in step S11 (step S12).

Next, the control server CS determines whether or not a predetermined number (for example, one) or more of recovery route candidates have been identified by the search in step S12 (step S13). When the predetermined number or more of recovery route candidates have been identified (step S13: YES), the control server CS proceeds to step S15. On the other hand, when the predetermined number or more of recovery route candidates cannot be identified (step S13: NO), the control server CS performs a change to relax the threshold value for detecting a passage suitable for recovery of the UAV 1 (step S14), returns to step S11, re-detects a passage according to the relaxed threshold value from the recovery area, and performs the processing of step S12 and subsequent steps in the same manner as above.

In step S15, the control server CS calculates the recovery cost for the recovery route candidate identified in step S13 on the basis of at least one of the recovery distance of the recovery route candidate and the parameter representing the feature amount. Next, the control server CS transmits the presentation information including the recovery cost calculated in step S15 to the operation terminal T (step S16). The presentation information includes request information for designating any one landing point candidate of the plurality of landing point candidates as the emergency landing point. Alternatively, the presentation information includes request information for designating any one recovery route candidate of the plurality of recovery route candidates as a recovery route. Incidentally, when there is only one recovery route candidate identified in step S13, the presentation information includes request information for designating the one recovery route candidate as the recovery route.

When the operation terminal T receives the presentation information from the control server CS, the operation terminal T displays the above-mentioned request information on the display screen together with the recovery cost for each of the landing point candidate and the recovery route candidate (step S17). Then, when the operator of the UAV 1 designates a desired landing point candidate or recovery route candidate (for example, a landing point candidate or recovery route candidate displayed on the map) in response to the request information, the operation terminal T transmits the designation information indicating the designated landing point candidate or recovery route candidate to the control server CS (step S18).

Incidentally, when the operator of the UAV 1 cannot designate a landing point candidate or a recovery route candidate because there is no desired landing point candidate or recovery route candidate, the operator of the UAV 1 may specify, for example, a re-search button displayed on the display screen. With this configuration, the operation terminal T transmits a re-search request for the landing point candidate or the recovery route candidate to the control server CS. When the control server CS receives the re-search request from the operation terminal T, the control server CS shifts to step S10, performs re-setting to expand the above search range, re-searches for landing point candidates included in the re-set search range (step S8), and performs the processing of step S9 and subsequent steps in the same manner as above.

When the control server CS receives the designation information from the operation terminal T, the control server CS selects the landing point candidate shown by the designation information as the emergency landing point and selects the recovery route candidate connecting the landing point candidate to the recovery start point as the recovery route (step S19) so as to determine the emergency landing point and the recovery route. Alternatively, the control server CS selects the recovery route candidate shown by the designation information as the recovery route and selects the landing point candidate connected to the recovery route candidate as the emergency landing point so as to determine the emergency landing point and the recovery route.

Next, the control server CS transmits recovery route information indicating the determined emergency landing point and recovery route to the operation terminal T (step S20). This recovery route information includes, for example, map information (for example, map information of the recovery area) indicating the position of the emergency landing point and the trajectory of the recovery route. When the operation terminal T receives the recovery route information from the control server CS, the operation terminal T displays the map of the recovery area on the display screen and displays the position of the emergency landing point and the trajectory of the recovery route on the map (step S21). Consequently, the recoverer can use the displayed recovery route to head for the emergency landing point.

Next, the control server CS transmits the position information of the determined emergency landing point to the UAV 1 (step S22). When the UAV 1 receives the position information of the emergency landing point from the control server CS, the UAV 1 autonomously flies toward the emergency landing point on the basis of the position information and makes an emergency landing at the emergency landing point (step S23). Incidentally, in the above operation example, the operator of the UAV 1 is the same as the recoverer of the UAV 1, but when the operator of the UAV 1 is an administrator of the GCS, a person (e.g., a person who can contact the administrator) other than the operator of the UAV 1 may be the recoverer of the UAV 1. In this case, the presentation information is transmitted from the control server CS to a terminal of the administrator of the GCS via a server constituting the GCS, and is presented to the administrator. The terminal of the administrator has the same function as the operation terminal T, and can transmit the designation information and the like to the control server CS.

As described above, according to the above embodiment, the unmanned aerial vehicle system S is configured to identify the landing point candidate that is a candidate for the emergency landing point for causing the UAV 1 flying toward the destination point to make an emergency landing at other than the destination point and calculate the recovery cost regarding the recovery route candidate connecting the reference point and the landing point candidate, the recovery cost being used to determine the recovery route connecting the reference point and the emergency landing point or the emergency landing point. Therefore, it is possible to obtain information suitable for recovery of the UAV 1.

Moreover, in the above operation example, searching and identifying a landing point candidate suitable for landing of the UAV 1, detecting a passage suitable for recovery of the UAV 1, searching and identifying a recovery route candidate, and calculating a recovery cost regarding a recovery route candidate are configured to be performed by the control server CS. However, all or part of these processing may be performed by another computer included in the UAV 1 or the unmanned aerial vehicle system S.

Incidentally, the above-described embodiment is one embodiment of the present invention, and the present invention is not limited to the above-described embodiment, changes from the above-described embodiment can be made on various configurations and the like within a scope not departing from the gist of the present invention, and such cases shall be also included in the technical scope of the present invention. For example, in the above embodiment, the ground surface information is configured to be obtained on the basis of the sensing data acquired by sensing the ground surface by the UAV 1. However, even when the sensing data cannot be acquired, the ground surface information can be acquired from the map information stored in the storage unit 22. In this case, the landing point candidate suitable for landing of the UAV 1 is identified and the passage suitable for recovery is detected on the basis of the ground surface information obtained based on the map information. Moreover, in the above embodiment, the UAV 1 is configured to determine whether or not having been in the emergency state, but instead, the control server CS may be configured to determine the emergency state of the UAV 1 on the basis of the information from the UAV 1 or information (e.g., weather information) from another server. Moreover, in the above embodiment, the control server CS may be composed of a plurality of devices, and for example, the point candidate identifying unit and the recovery cost calculation unit may be configured to be provided in different devices. Moreover, in the above embodiment, the recovery start point and the recovery return point have been described as examples of the reference point related to the recovery, but the aforementioned recovery cost may be configured to be calculated using points other than the above points, for example, a point within the vicinity of the recovery start point or the recovery return point, a point of a boundary from a road on the way to the landing point candidate to a mountain road, or the like, as the reference point.

REFERENCE SIGNS LIST

1 UAV
2 UTMS
3 PMS
CS Control server
T Operation terminal
11 Drive unit
12 Positioning unit
13 Radio communication unit
14 Imaging unit
15 Control unit
21 Communication unit
22 Storage unit
23 Control unit
23a Ground surface information acquisition unit
23b Point candidate identifying unit
23c Route candidate identifying unit
23d Recovery cost calculation unit 23e Information providing unit
23f Selection unit
23g Landing control unit
S Unmanned aerial vehicle system

The invention claimed is:

1. An information processing system comprising:
at least one memory configured to store program code; and at least one processor configured to access the program code and operate as instructed by the program code, the program code including:
point candidate identifying code configured to cause the at least one processor to identify a landing point candidate that is a candidate for a landing point for causing an unmanned aerial vehicle flying toward a destination point to make an emergency landing at other than the destination point;
recovery cost calculation code configured to cause the at least one processor to calculate a recovery cost regarding a recovery route candidate connecting a reference point and the landing point candidate, the recovery cost being used to determine a recovery route connecting the reference point and the landing point; and
control code configured to cause the at least one processor to control the unmanned aerial vehicle to land at the landing point.

2. The information processing system according to claim 1, wherein the point candidate identifying code causes the at least one processor to identify the landing point candidate suitable for landing of the unmanned aerial vehicle on the basis of information of a ground surface in a predetermined area.

3. The information processing system according to claim 2, wherein the information of the ground surface includes at least one of three-dimensional shape data of the ground surface and a ground surface attribute.

4. The information processing system according to claim 1, wherein the point candidate specifying code causes the at least one processor to search for the landing point candidate included in a search range set based on a current position of the unmanned aerial vehicle.

5. The information processing system according to claim 4, wherein the point candidate identifying code causes the at least one processor to set the search range according to information regarding an emergency state of the unmanned aerial vehicle.

6. The information processing system according to claim 1, the program code further including:
passage detection code configured to cause the at least one processor to detect a passage suitable for recovery of the unmanned aerial vehicle on the basis of information of a ground surface in a predetermined area; and
route candidate search code configured to cause the at least one processor to search for the recovery route candidate on the basis of the passage detected by the passage detection code.

7. The information processing system according to claim 6, wherein the route candidate search code causes the at least one processor to search for the recovery route candidate formed by connecting a plurality of the passages detected by the passage detection code.

8. The information processing system according to claim 6, wherein the route candidate search code causes the at least one processor to search for the recovery route candidate so that, among a first passage that both a recoverer and a recovery vehicle can pass through and a second passage that only the recoverer out of the recoverer and the recovery vehicle can pass through, the first passage is prioritized.

9. The information processing system according to claim 6, wherein the recovery cost calculation code causes the at least one processor to calculate the recovery cost for each of a plurality of the recovery route candidates searched by the route candidate search code.

10. The information processing system according to claim 1, wherein the recovery cost calculation code causes the at least one processor to calculate the recovery cost for each of a plurality of the landing point candidates identified by the point candidate identifying code.

11. The information processing system according to claim 1, wherein the recovery cost calculation code causes the at least one processor to calculate the recovery cost on the basis of a distance of the recovery route candidate.

12. The information processing system according to claim 1, wherein the recovery cost calculation code causes the at least one processor to calculate the recovery cost on the basis of a parameter representing a feature amount in the recovery route candidate.

13. The information processing system according to claim 12, wherein the parameter includes at least one of magnitude of a gradient in the recovery route candidate and a priority level of a ground surface attribute.

14. The information processing system according claim 1, wherein the recovery cost calculation code causes the at least one processor to calculate the recovery cost by distinguishing between an outward trip and a return trip in the recovery route candidate.

15. The information processing system according to claim 1, the program code further including:
landing point selection code configured to cause the at least one processor to select the landing point from a plurality of the landing point candidates on the basis of the recovery cost calculated for each of the plurality of the landing point candidates.

16. The information processing system according to claim 15, wherein the landing point selection code causes the at least one processor to select the landing point further on the basis of a positional relationship between a current position of the unmanned aerial vehicle and the landing point candidate.

17. The information processing system according to claim 1, the program code further including: presentation code configured to cause the at least one processor to present information including the recovery cost calculated for each of a plurality of the landing point candidates to a user of the unmanned aerial vehicle; and
landing point selection code configured to cause the at least one processor to select the landing point from the plurality of the landing point candidates on the basis of designation of the landing point candidate by the user.

18. The information processing system according to claim 1, the program code further including:
recovery route selection code configured to cause the at least one processor to select the recovery route from a plurality of the recovery route candidates on the basis of the recovery cost calculated for each of the plurality of the recovery route candidates.

19. The information processing system according to claim 1, wherein the point candidate identifying code causes the at least one processor to estimate a ground surface attribute on the basis of sensing data obtained by the unmanned aerial vehicle sensing a ground surface in a predetermined area, and to identify the landing point candidate suitable for landing of the unmanned aerial vehicle on the basis of the estimated ground surface attribute.

20. The information processing system according to claim 1, wherein the recovery route is a path for a recoverer to travel on the ground.

21. The information processing system according to claim 1, wherein the recovery route is a path for a recoverer to travel on the ground for carrying the unmanned aerial vehicle.

22. The information processing system according to claim 1, wherein the control code causes the at least one processor to transmit position information of the landing point to the unmanned aerial vehicle via a communication network such that the unmanned aerial vehicle autonomously flies toward the landing point makes the emergency landing at the landing point.

23. The information processing system according to claim 1, the program code further including:
recovery route selection code configured to cause the at least one processor to select the recovery route from a plurality of the recovery route candidates on the basis of the recovery cost calculated for each of the plurality of the recovery route candidates;
determination code configured to cause the at least one processor to determine the landing point on the selected recovery route; and
wherein control code causes the at least one processor to control the unmanned aerial vehicle to land at the determined landing point.

24. The information processing system according to claim 1, wherein the recovery cost calculation code causes the at least one processor to calculate recovery cost elements for each parameters at each position on a passage forming the recovery route candidate, the parameters including at least two of a size of a road width, magnitude of a gradient and a priority level of a ground surface attribute, and to calculate the recovery cost by integrating, from the reference point to the landing point candidate, a sum of the calculated recovery cost elements.

25. An information processing device comprising:
at least one memory configured to store program code; and at least one processor configured to access the program code and operate as instructed by the program code, the program code including:
recovery cost calculation code configured to cause the at least one processor to calculate a recovery cost regarding a recovery route candidate connecting a landing point candidate identified as a candidate for a landing point for causing an unmanned aerial vehicle flying toward a destination point to make an emergency landing at other than the destination point and a reference point, the recovery cost being used to determine a recovery route connecting the reference point and the landing point; and
control code configured to cause the at least one processor to control the unmanned aerial vehicle to land at the landing point.

26. An information processing method executed by one or a plurality of computers, the method comprising:
identifying a landing point candidate that is a candidate for a landing point for causing an unmanned aerial vehicle flying toward a destination point to make an emergency landing at other than the destination point;
calculating a recovery cost regarding a recovery route candidate connecting a reference point and the landing point candidate, the recovery cost being used to determine a recovery route connecting the reference point and the landing point; and
controlling the unmanned aerial vehicle to land at the landing point.

* * * * *